United States Patent
Matzkel

(10) Patent No.: US 10,819,816 B1
(45) Date of Patent: Oct. 27, 2020

(54) INVESTIGATING AND SECURING COMMUNICATIONS WITH APPLICATIONS HAVING UNKNOWN ATTRIBUTES

(71) Applicant: CyberArk Software Ltd., Petach-Tikva (IL)

(72) Inventor: Ben Matzkel, Tel Aviv (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 16/416,645

(22) Filed: May 20, 2019

(51) Int. Cl.
  *H04L 29/08* (2006.01)
  *G06K 9/62* (2006.01)
(52) U.S. Cl.
  CPC ........ *H04L 67/2804* (2013.01); *G06K 9/6257* (2013.01); *H04L 67/2819* (2013.01)
(58) Field of Classification Search
  CPC . H04L 67/2804; H04L 67/28; H04L 67/2819; G06K 9/6256
  See application file for complete search history.

(56) References Cited

U.S. PATENT DOCUMENTS

| | | | | |
|---|---|---|---|---|
| 8,032,866 | B1* | 10/2011 | Golender | G06F 11/366 717/128 |
| 2008/0244074 | A1* | 10/2008 | Baccas | H04L 67/28 709/227 |
| 2017/0104721 | A1* | 4/2017 | McClintock | H04L 67/28 |

* cited by examiner

*Primary Examiner* — Nam T Tran
(74) *Attorney, Agent, or Firm* — Finnegan, Henderson, Farabow, Garrett & Dunner, LLP

(57) ABSTRACT

Disclosed embodiments relate to systems and methods for analyzing data communication attributes of the target application without requiring preexisting knowledge of the data communication attributes. Techniques include implementing a training phase with respect to the target application comprising: identifying a training data element to be transmitted from an interface application to a target application through an intermediary agent, receiving a training electronic communication from the interface application containing the training data element, and analyzing one or more structural attributes of the training electronic communication; and implementing a runtime phase with respect to the target application comprising: receiving a runtime electronic communication transmitted from the interface application, identifying, based on the one or more structural attributes analyzed during the training phase, a corresponding one or more structural attributes of the runtime electronic communication, and implementing a control operation for the runtime electronic communication.

19 Claims, 10 Drawing Sheets

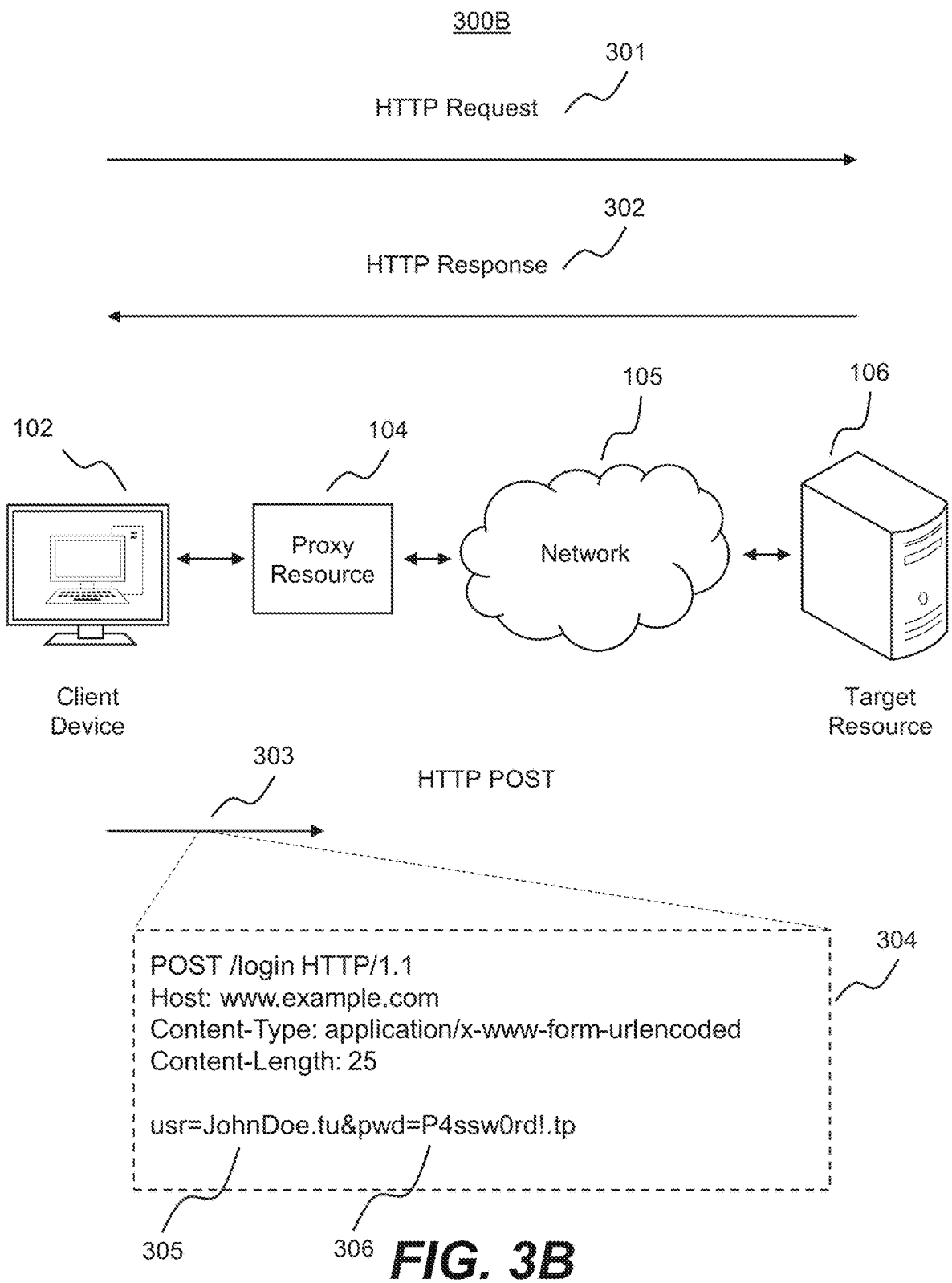

INVESTIGATING AND SECURING COMMUNICATIONS WITH APPLICATIONS HAVING UNKNOWN ATTRIBUTES

BACKGROUND

With the proliferation of network-based software, applications are increasingly interacting with and complementing each other. From mobile applications to enterprise software and IoT agents, the web of software that provides a complete functional set of capabilities is often interwoven and interdependent.

Many applications are specific to a particular function or operation, such as backup software, anti-virus software, authentication software, user guidance software, social media applications, communications tools, and more. In some cases, the application developer provides published interfaces (e.g., application programming interfaces (APIs)), which define software elements, commands, parameters, functions, protocols, and capabilities. Such interfaces help developers and users integrate certain applications with other applications, in order to ensure continuity and lack of inconsistency between the applications.

Not all applications, however, have published APIs that define their attributes relevant to integrating them with other applications. Thus, if an organization wishes to secure or control a particular application (e.g., control use of passwords or other credentials, control file uploading activity, monitor use of particular text in outbound communications, etc.), the organization will have difficulty doing so without reference to APIs. For example, the exact manner of how the application processes data, transmits data, what fields are used, how files are exchanged, and other parameters will be unknown and thus difficult to control.

Existing techniques attempt to control software by filtering data. For example, full-disk encryption can be implemented in some cases by an underlying operating system that supports an application. This may not require prior knowledge of the application itself (e.g., through APIs). Similarly, anti-virus software can operate by filtering Internet traffic and scanning files that are downloaded from the application using an HTTP proxy. This may also not require understanding of the application's parameters themselves. But filtering-type approaches like these are typically surface-level solutions. They do not allow for deeper interaction with, and control of, applications. They do not reveal how data is processed or transmitted by the application, how communications are received and transmitted, how files are exchanged, and other important attributes of the application.

In view of these and other deficiencies in existing techniques, technological solutions are needed for investigating and controlling applications. Advantageously, such techniques should be able to learn the parameters and attributes of applications that are involved in data processing, data communications, use of passwords or other credentials, transmission of files, use of particular text in communications, and other activities of interest. Further, techniques should be able to perform these investigation and learning processes without requiring preexisting knowledge of the application's structure (e.g., through APIs). According to the techniques described herein, essentially unknown applications may be automatically investigated, secured, and controlled. Using these techniques, organizations can more accurately and proactively control activity such as use or weak passwords, use of improper credentials, improper file uploads, outbound communications containing particular sensitive text, and various other sensitive activities.

SUMMARY

Some disclosed embodiments describe non-transitory computer readable media, systems, and methods for analyzing data communication attributes of the target application without requiring preexisting knowledge of the data communication attributes. For example, in an exemplary embodiment, there may be a non-transitory computer readable medium including instructions that, when executed by at least one processor, cause the at least one processor to perform operations for analyzing data communication attributes of the target application without requiring preexisting knowledge of the data communication attributes. The operations may comprise implementing, by the intermediary agent, a training phase with respect to the target application, the training phase comprising: identifying a training data element to be transmitted from the interface application to the target application through the intermediary agent, receiving, at the intermediary agent, a training electronic communication from the interface application containing the training data element, and analyzing one or more structural attributes of the training electronic communication based on the training data element being included in the training electronic communication; and implementing, by the intermediary agent, a runtime phase with respect to the target application, the runtime phase comprising: receiving, at the intermediary agent, a runtime electronic communication transmitted from the interface application, identifying, based on the one or more structural attributes analyzed during the training phase, a corresponding one or more structural attributes of the runtime electronic communication, and implementing, based on the corresponding one or more structural attributes, a control operation for the runtime electronic communication.

According to a disclosed embodiment, the intermediary agent is implemented as a proxy service between the interface application and the target application.

According to a disclosed embodiment, the intermediary agent is implemented as an application running on a machine that also runs the interface application.

According to a disclosed embodiment, the control operation includes implementing a security control for the runtime electronic communication.

According to a disclosed embodiment, the security control includes at least one of: a remediation operation, a backup operation, or an access control operation.

According to a disclosed embodiment, the one or more structural attributes of the training electronic communication include a portion of the training electronic communication containing at least one of: a cookie or an image.

According to a disclosed embodiment, the one or more structural attributes of the training electronic communication include a portion of the training electronic communication containing at least one of: an application secret, an identity secret, an application credential, an identity credential, a secure token, an application password, or an identity password.

According to a disclosed embodiment, the training phase is performed a plurality of times with respect to a plurality of target applications accessed by a particular identity, and a result of performing the training phase the plurality of times is maintained as a customized profile for the particular identity for use in the runtime phase for the particular identity.

According to a disclosed embodiment, the intermediary agent is further configured to, during the runtime phase: receive a new runtime electronic communication, determine that the new runtime electronic communication does not share the one or more structural attributes analyzed during the training phase, and transmit the new runtime electronic communication to the target application without performing the control operation.

According to a disclosed embodiment, the intermediary agent operates transparently to the interface application.

According to another disclosed embodiment, there may be a computer-implemented method for analyzing data communication attributes of a target application without requiring preexisting knowledge of the data communication attributes. The method may comprise implementing, by the intermediary agent, a training phase with respect to the target application, the training phase comprising: identifying a training data element to be transmitted from the interface application to the target application through the intermediary agent, receiving, at the intermediary agent, a training electronic communication from the interface application containing the training data element, and analyzing one or more structural attributes of the training electronic communication based on the training data element being included in the training electronic communication; and implementing, by the intermediary agent, a runtime phase with respect to the target application, the runtime phase comprising: receiving, at the intermediary agent, a runtime electronic communication transmitted from the interface application, identifying, based on the one or more structural attributes analyzed during the training phase, a corresponding one or more structural attributes of the runtime electronic communication, and implementing, based on the corresponding one or more structural attributes, a control operation for the runtime electronic communication.

According to a disclosed embodiment, the intermediary agent defines the training data element and provides the training data element to the interface application.

According to a disclosed embodiment, the interface application is configured to embed the training data element into a document.

According to a disclosed embodiment, the interface application is configured to enter the training data element into a fillable form.

According to a disclosed embodiment, the runtime electronic communication includes at least a portion of an HTML document.

According to a disclosed embodiment, the runtime electronic communication includes at least a portion of a Java-based object.

According to a disclosed embodiment, the intermediary agent is configured to perform a plurality of different training phases with respect to a plurality of different target applications.

According to a disclosed embodiment, the one or more structural attributes of the training electronic communication include a position in the training electronic communication of a password.

According to a disclosed embodiment, the one or more structural attributes of the training electronic communication include a position in the training electronic communication of an uploaded file.

According to a disclosed embodiment, the one or more structural attributes of the training electronic communication include a position in the training electronic communication of transmitted data.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 3B is a block diagram of an exemplary system showing a detected and intercepted communication, in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for analyzing data communication attributes of a target application without requiring preexisting knowledge of the data communication attributes, as addressed herein, overcome several important technical problems in the fields of data communications security, privacy, content rights management, and data communications performance. Using the techniques discussed below, application functionality and structure may be learned even if no published API for the application is available. Through the unique learning phase described below, the structural attributes and parameters of an application may automatically be discovered with test data. The results of the unique learning phase may be stored as customized profiles for use in a runtime phase, where the results of the learning phase are utilized to detect communications of interest (e.g., containing weak passwords or other credentials, improperly uploading files, communicating on topics of interest, etc.).

Reference will now be made in detail to the disclosed embodiments, examples of which are illustrated in the accompanying drawings.

Figure 1:
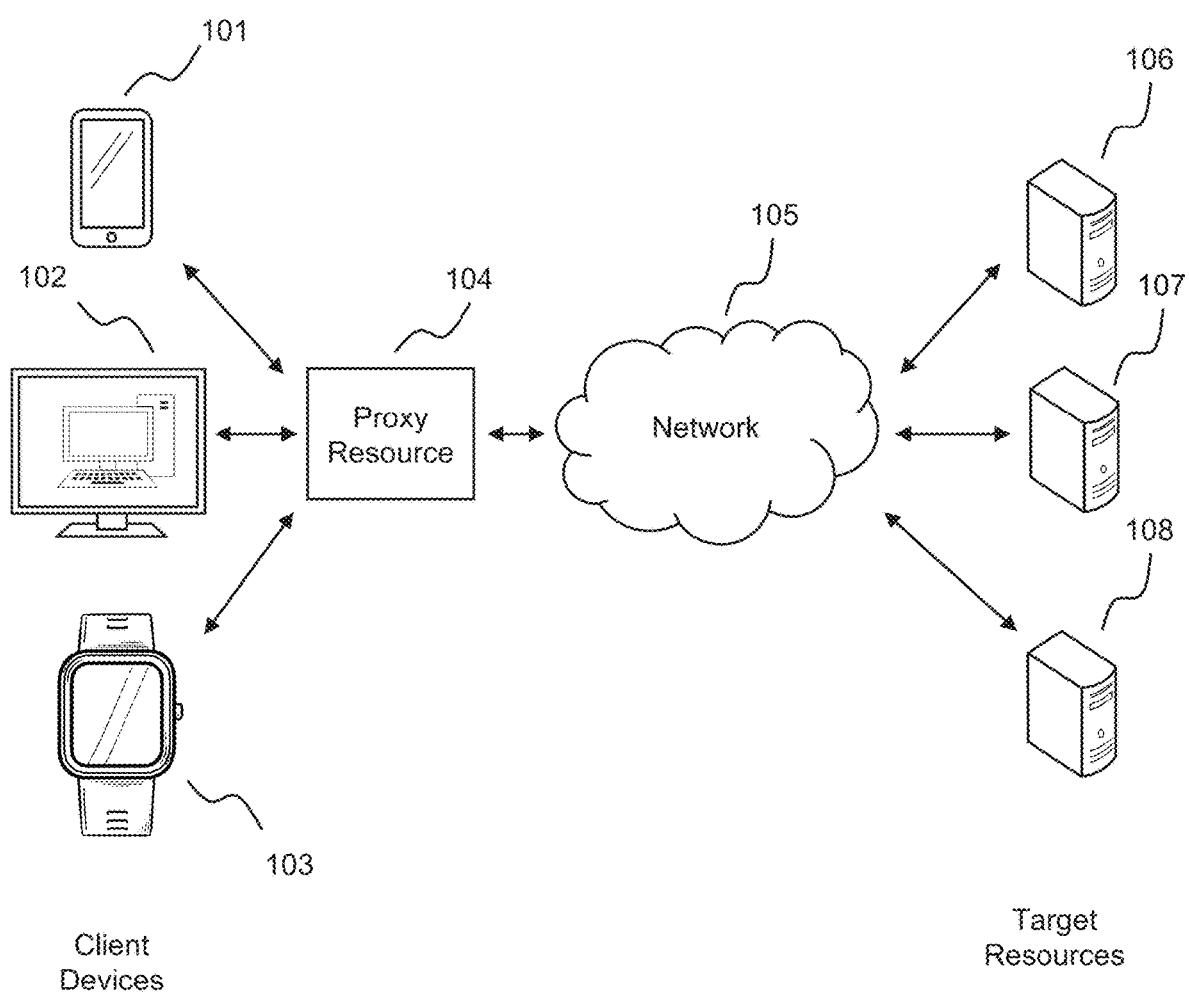
FIG. 1 is a block diagram of an exemplary system for analyzing data communication attributes of a target application without requiring preexisting knowledge of the data communication attributes, in accordance with disclosed embodiments.

FIG. 1 illustrates an exemplary system 100 for analyzing data communication attributes of a target application without requiring preexisting knowledge of the data communication attributes. In accordance with system 100, client devices 101-103 may each run one or more interface applications, with which a user or other application may interact. The interface applications may communicate through network 105 with target applications hosted by one or more network resources 106-108. As described further below, proxy resource 104 may monitor communications between client devices 101-103 and target resources 106-108. Proxy resource 104 may perform a learning or training phase based on the communications it inspects, and may build customized profiles for particular applications. Further, proxy resource 104 may implement a runtime phase, where it monitors communications between client devices 101-103 and target resources 106-108 to identify data elements of interest (e.g., passwords, credentials, files, data, text, etc.). When such data elements are identified, proxy resource 104 may determine whether to perform a control action for the communication (e.g., before the communication is able to reach target resources 106-108).

Client devices 101-103 may be various types of computing devices running interface applications and being configured for network communications. Examples of client devices 101-103 include smartphones 101, personal computers 102, and smart watches 103. Further examples may include laptops, tablets, IoT devices, wearable computer devices (e.g., smart clothing, smart jewelry, etc.), automotive computer devices, smart home appliances, etc. As discussed further below, such client computing devices 101-103 may include hardware processors and memories for storing data and/or software instructions, as well as network communications interfaces for exchanging data with remote servers (e.g., target resources 106-108).

Proxy resource 104 may be functionally located between interface applications running on client devices 101-103 and target resources 106-108. In some embodiments, proxy resource 104 is integrated into client devices 101-103 themselves. For example, the same physical client device 101-103 executing the interface application may additionally run (e.g., using the same, or different, processor and memory) proxy resource 104 as an agent. In other embodiments, proxy resource 104 may be a separate server or gateway device, distinct from client devices 101-103. For example, in this situation proxy resource 104 may be a dedicated server on an enterprise network or home network, a DNS server configured for network address resolution and/or rerouting, or a network gateway device located at the periphery of an enterprise network or home network. Regardless of where proxy resource 104 is located (e.g., integrated into client devices 101-103 or separate), in some embodiments proxy resource 104 may operate transparently to client devices 101-103 and their users. That is, proxy resource 104 may perform its communications monitoring, learning, and runtime functions without visible prompts or service interruptions from the perspective of client devices 101-103. Of course, in other embodiments proxy resource 104 may not be transparent to client devices 101-103. For example, when proxy resource 104 detects a communication having a data element that was discovered based on the training phase (e.g., a weak password, expired credential, sensitive text, etc.), proxy resource 104 may in some embodiments generate a prompt to client devices 101-103 regarding the communication and/or may block the communication, as discussed further below.

Network 105 may be various types of data communication networks that can carry data communications between client devices 101-103 and target resources 106-108. For example, network 105 may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile network, a private data network, a virtual private network using a public network, a nearfield communications technique (e.g., Bluetooth, infrared, etc.) that enables the system 100 to send and receive information between the components in the system 100. In some embodiments, network 105 may include two or more of these forms of communications. As an example, client devices 101-103 may communicate with proxy 104 via internal communications (e.g., computer bus) or via a local network (e.g., LAN), while proxy resource 104 communicates with target resources 106-108 via the Internet. Of course, different combinations are possible as well.

Target resources 106-108 may be various types of application servers, website servers, database servers, or other network-based hosts of application functionality. In some embodiments, target resources 106-108 and their corresponding target applications may be hosted in an on-premises environment, while in other embodiments they may be hosted in a virtualized environment (e.g., in a cloud-based or container-based environment built using AWS™, Azure™, IBM Cloud™, Docker™ containers, Java™ containers, etc.). The target applications being hosted by target resources 106-108 may be, for example, business applications, database applications, social media applications, website applications, and more. These target applications may be designed to operate in conjunction with the interface applications running on client devices 101-103. As an example, client devices 101-103 may run a web browser (e.g., Chrome™, Internet Explorer™, Firefox™, etc.) while target resources 106-108 may be web servers that serve a particular web page to client devices 106-108. Further, client devices 101-103 may run a social media application (e.g., Facebook™, Twitter™, LinkedIn™, Instagram™, etc.) while target resources 106-108 may run target applications configured to receive and transmit content (e.g., text, images, etc.) to the client application, retrieve or process content from backend databases at target resources 106-108, or perform other functionality associated with the social media application being run on client devices 101-103.

Figure 2A:
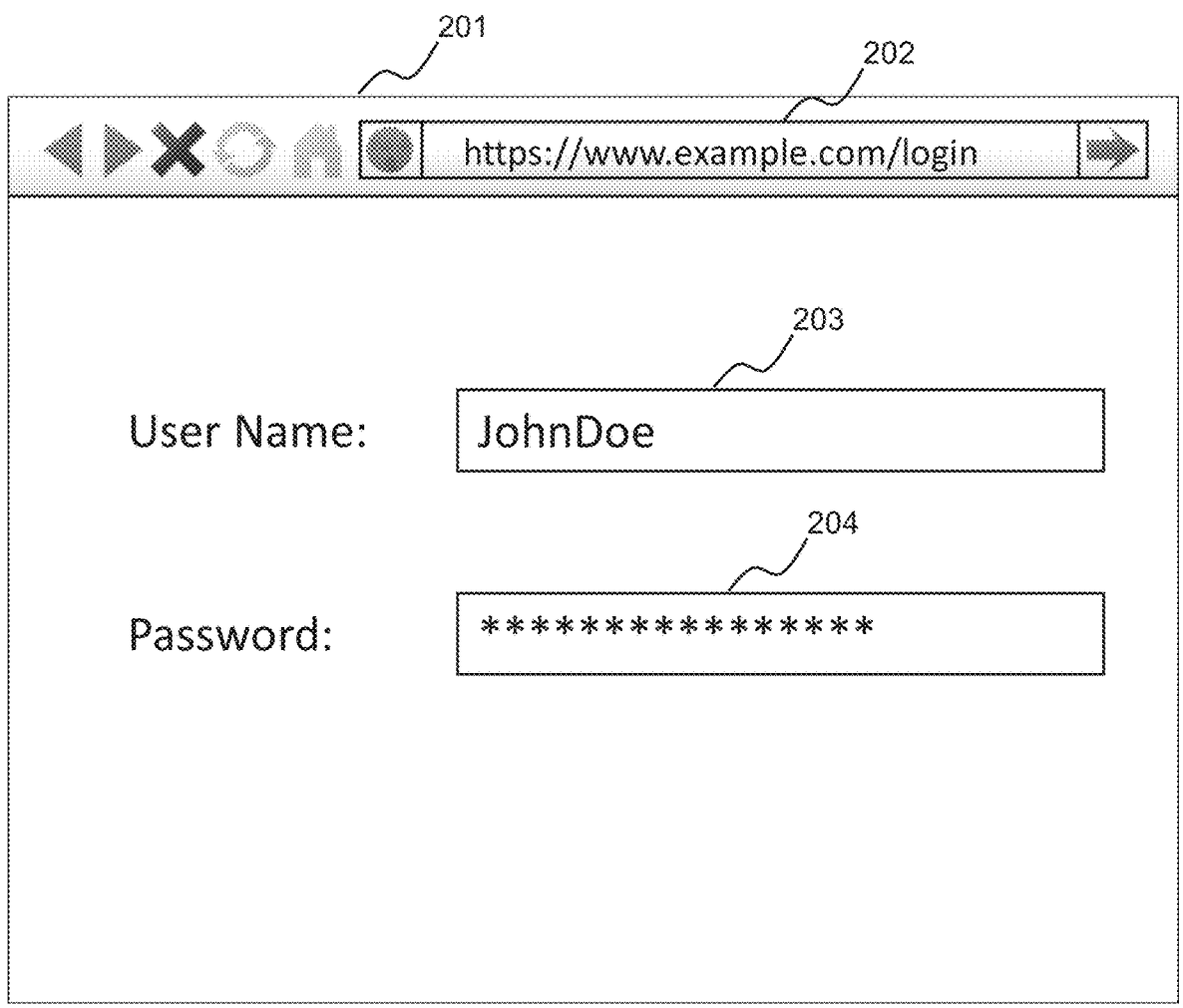
FIG. 2A is an illustration of an exemplary application interface for providing a username and password, in accordance with disclosed embodiments.

FIG. 2A is an illustration of an exemplary application interface 200A for providing a username and password. Consistent with the discussion above, interface 200A may be a web browser interface (e.g., Chrome™, Internet Explorer™, Firefox™, etc.). Similarly, interface 200A may be other types of application interfaces as well. Interface 200A includes a browser window 201 and an address bar 202. Users may enter URLs or other forms of network address information in address bar 202, such as https://www.example.com/login, as shown in FIG. 2A. If the particular web page, or application screen, that the user is interacting with calls for the user to input a username 203 and password 204, the user can do so as shown in FIG. 2A. Once the user has input these field elements, the entered data (i.e., username and password) may be transmitted from the interface application to a target resource over a network. For example, the target resource may be a web server hosting https://www.example.com/login or may be an application server supporting the interface application with which the user is interacting.

Figure 2B:
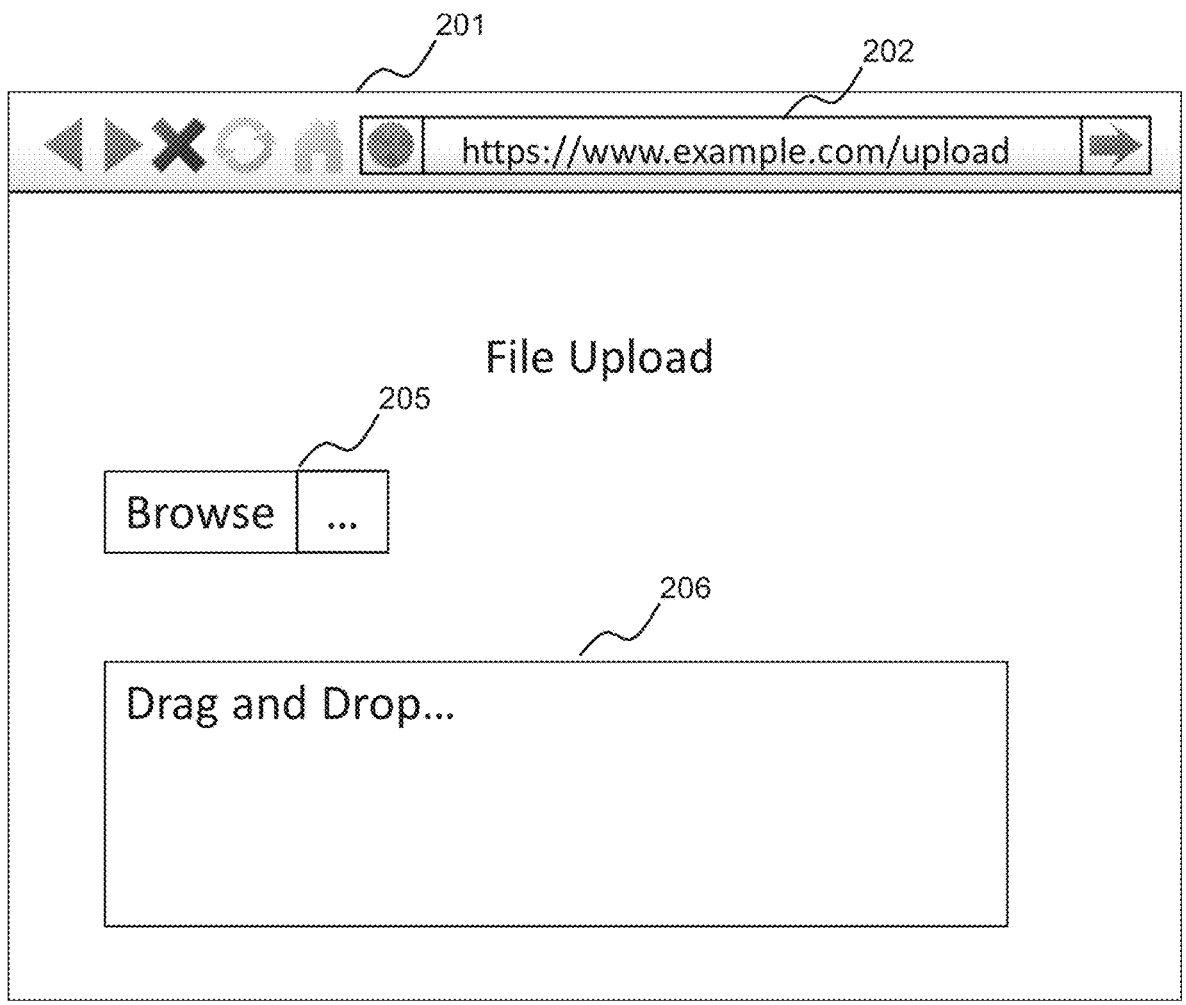
FIG. 2B is an illustration of an exemplary application interface for uploading a file, in accordance with disclosed embodiments.

FIG. 2B is an illustration of an exemplary application interface 200B for uploading a file. As illustrated, network address bar 202 may include a URL associated with a file upload service (https://www.example.com/upload), which allows a user to select a file for uploading to the target resource. The user may upload the file via a filesystem directory tool 205, by dragging-and-dropping the file into a field 206, or through other techniques. For example, interface 200B may be associated with a social media site, file sharing site, personal storage site, or various other types of websites or applications. Users may upload various types of content through interface 2006, such as word processing files, images, videos, music files, code, and more.

Figure 2C:
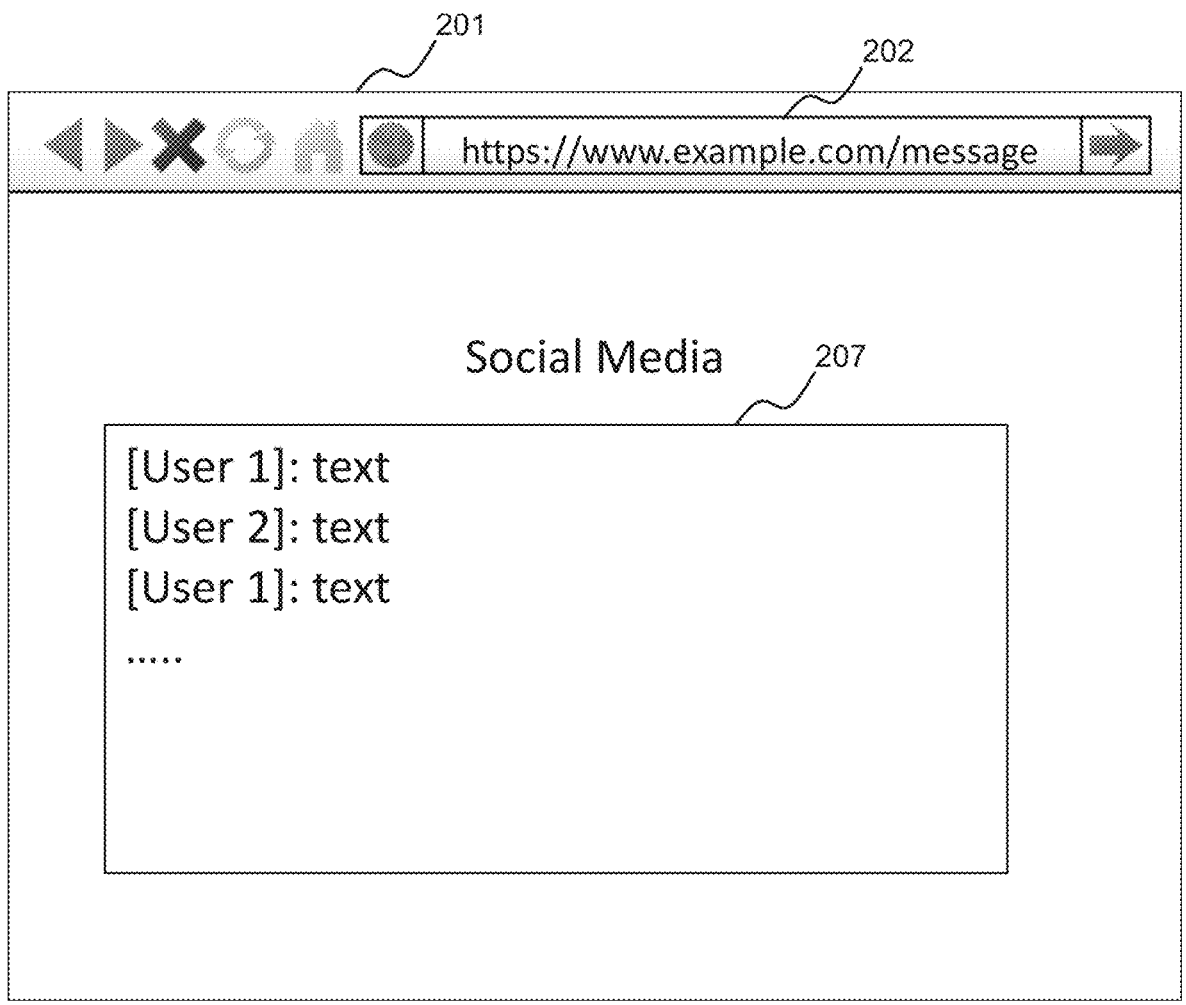
FIG. 2C is an illustration of an exemplary application interface for engaging in social media communications activity, in accordance with disclosed embodiments.

FIG. 2C is an illustration of an exemplary application interface 200C for engaging in social media communications activity. Interface 200C may be provided by a social media service such as Facebook™, Twitter™, Instagram™, LinkedIn™, or various others. Using interface 200C, users may share content, messages, files, and more. For example, social media interface 200C may include a messaging interface 207, where users can send and receive messages, posts, or other communications.

Figure 2D:
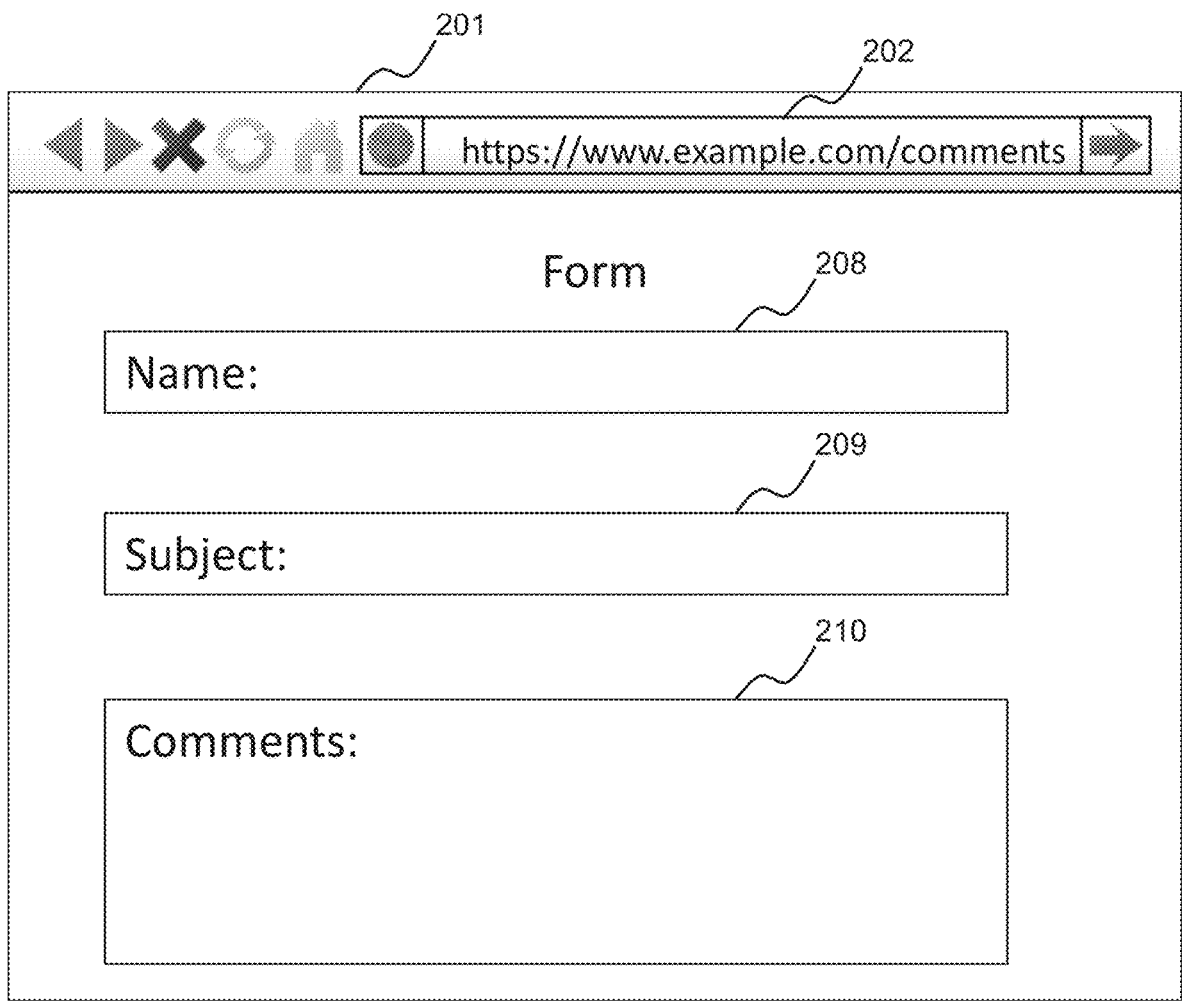
FIG. 2D is an illustration of an exemplary application interface for inputting information or content in a form, in accordance with disclosed embodiments.

FIG. 2D is an illustration of an exemplary application interface 200D for inputting information or content in a form. Interface 200D may be associated with a website or application that allows users to post textual (or multimedia) comments, questions, product reviews, or various other types of communications. For example, users may fill out a form to include elements such as their name 208, a subject of their post 209, and the post 210 itself. In accordance with interface 200D, users may then submit their post or comments to a target resource, which may be a web server, application server, IT server, or various other types of target resources.

Figure 3A:
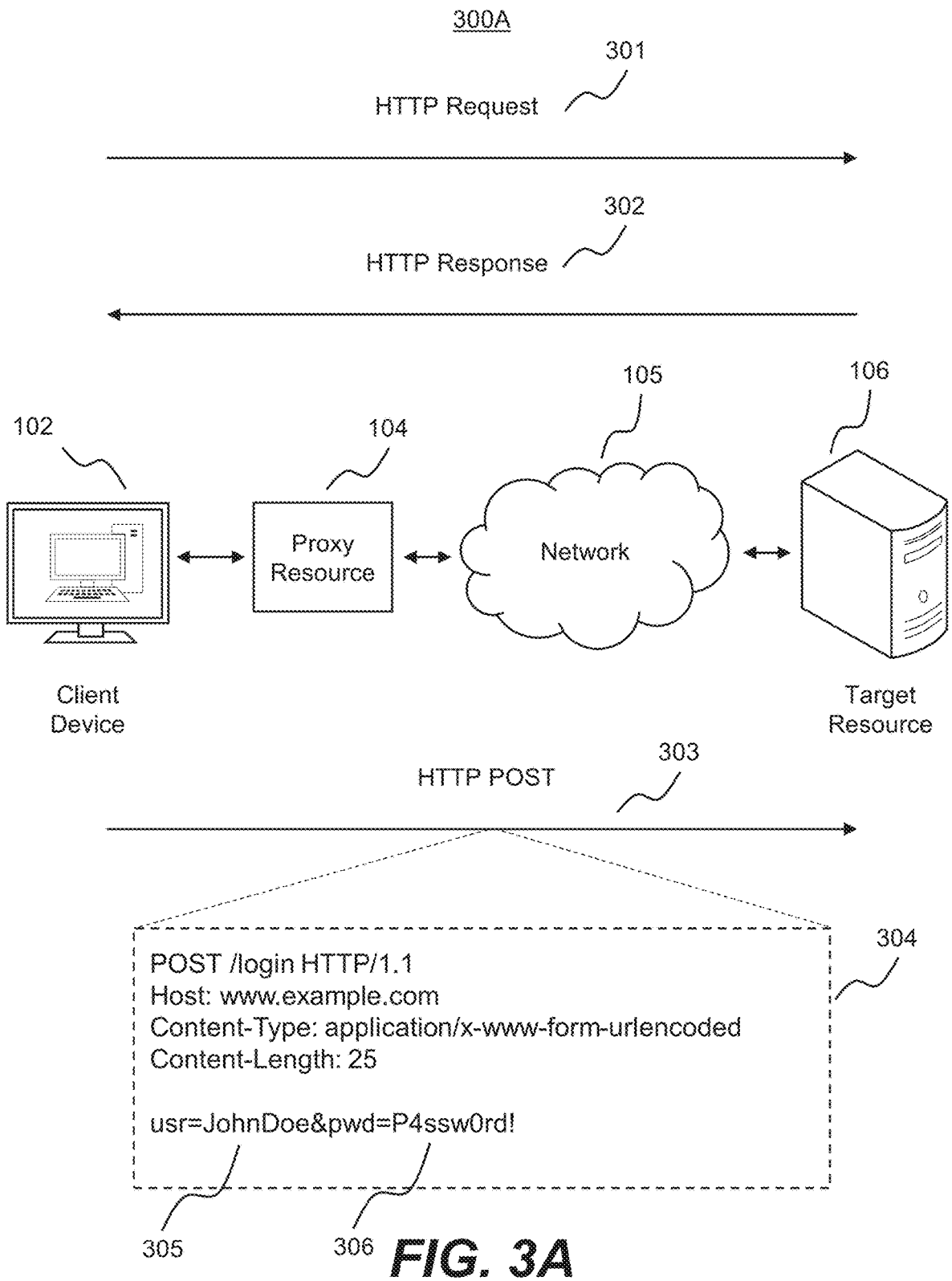
FIG. 3A is a block diagram of an exemplary system showing communications activity being monitored, in accordance with disclosed embodiments.

FIG. 3A illustrates an exemplary system 300A showing communications activity being monitored between client device 102 and network resource 106. In accordance with FIG. 3A, client device 102 may transmit a request 301 for content (e.g., an HTML web page, Java™-based web page, Flash™-based web page, application interface, application content, etc.). Request 301 may be addressed to network resource 106, which may be a web server, application server, or other target resource, as discussed above. Although request 301 is shown in FIG. 3A as a Hypertext Transfer Protocol (HTTP) request, request 301 may alternatively comply with other network communication protocols (e.g., Hypertext Transfer Protocol Secure (HTTPS), File Transfer Protocol (FTP), Lightweight Directory Access Protocol (LDAP), Internet Message Access Protocol (IMAP), Simple Mail Transfer Protocol (SMTP), Secure Shell (SSH), Transport Layer Security (TLS), Secure Sockets Layer (SSL), etc.). Accordingly, request 301 may be a request for a web page, for a file or other content, for an electronic mail transmission, for a database lookup, etc. Request 301 may be, for example, a request in response to which target resource 106 serves back a web page or application interface such as illustrated in FIGS. 2A-2D and discussed above. For example, target resource 106 may serve through an HTTP response 302 (or other types of responses, based on the various protocols noted above or others) a webpage or application interface to client device 102.

FIG. 3A also illustrates a further communication 303 that client device 102 may transmit to target resource 106. Communication 303 is shown in FIG. 3A as an HTTP POST communication, which may be a technique according to HTTP communications for client device 102 to transmit content or data to target resource 106. As examples of communication 303, client 102 may transmit to target resource 106 a username and password consistent with the embodiment of FIG. 2A, a file to be uploaded to target resource 106 consistent with the embodiment of FIG. 2B, a social media post consistent with the embodiment of FIG. 2C, or a form submission consistent with the embodiment of FIG. 2D. Various other types of responses 303 are possible as well, depending on the particular interface application being utilized on client device 102 and the target application being hosted by target resource 106. Further, while FIG. 3A depicts an HTTP POST response as communication 303, communication 303 need not be a POST response and need not be an HTTP-based response. For example, in some embodiments communication 303 may be an HTTP PUT message, FTP send or put message, LDAP ldapadd or ldapmodify message, or various other commands.

In the example of FIG. 3A, communication 303 may include contents 304 such as the host domain (www.example.com), a Content-Type field, and a Content-Length field. Further, contents 304 may include a username (usr) field 305 and password (pwd) field 306. Here, the username 305 may be JohnDoe and the password 306 may be P4ssw0rd!. If proxy resource 104 were to pass through communication 303 to target resource 106, the target application at target resource 106 could then receive communication 303, read message contents 304, and extract username 305 and password 306. If username 305 and password 306 matched a valid account at the target application, the user may be authenticated by target resource 106. Alternatively, if the username 305 and password 306 failed to match a valid account, authentication may be denied.

FIG. 3B illustrates an exemplary system 300B showing a detected and intercepted communication 303. In accordance with system 300B, proxy resource 104 may implement a training or learning process with respect to communication 303. In the training or learning process, proxy resource 104 may add an additional data element (e.g., added text, a suffix, a signature, or some other identifiable data) to response 303 before it can reach target resource 106. As an illustration, proxy resource 104 may receive a training communication 302 from target resource 106 or may receive communication 303 itself being transmitted from client device 102. In the example of FIG. 2A, where username 203 and password 204 fields are presented to a user, proxy resource 104 may add a unique data element to the username 305 and password 306 in communication 303. For example, as shown in contents 304, username 305 has been changed from John-Doe to JohnDoe.tu (where the ".tu" is a unique and identifiable data element) and password 306 has been changed from P4ssw0rd! to P4ssw0rd.tp (where ".tp") is a unique and identifiable data element. In this example, proxy resource 104 may designate ".tu" as the data element to represent a username field in communication 303 (and other similar communications) and ".tp" as the data element to represent a password field in communication 303 (and other similar communications).

Once proxy resource 104 (or another resource) has inserted the unique data elements (e.g., .tu and .tp) into communication 303, and communication 303 is detected at proxy resource 104, proxy resource 104 may then be able to specifically identify where in communication 303 the username 305 and password 306 fields are located. Similarly, with regard to the file upload, social media, and comment posting examples above in FIGS. 2B-2D), and other types of communications, unique data elements may be added into the resulting communication 303 that is transmitted from client device 102 en route to target resource 106. Proxy resource 104 may be configured to look for the unique data elements in each type of communication 303 (e.g., .tu and .tp, or various other possible unique data elements). In some embodiments, the unique data elements may be randomly generated text or numbers, may be preassigned text or numbers, or may be other uniquely identifiable characters.

Proxy resource 104 may be able to investigate several important structural and functional characteristics of the interface application running on client device 102 as well as the target application at target resource 106 by detecting the presence of the unique data elements in communication 303. For example, the location or content of the unique data element may reveal parameters such as HTTP form names (or other types of form names), element names, content encoding settings, multiple fields holding the same vales, encryption settings, target IP addresses, and more. Further, throughout a session between client device 102 and target resource 106, proxy 104 may additionally be able to learn whether certain fields (e.g., username 305 or password 306 fields, etc.) are being displayed in multiple locations, how long it takes for the target application at target resource 106 to store the data or respond, what additional information target resource 106 provides (e.g., an HTTP cookie, Flash™ cookie, Zombie cookie, Java™ cookie, etc.), whether target resource 106 provides additional content (e.g., executable files, data, etc.) to client device 102, and various other parameters and functionalities.

Figure 3C:
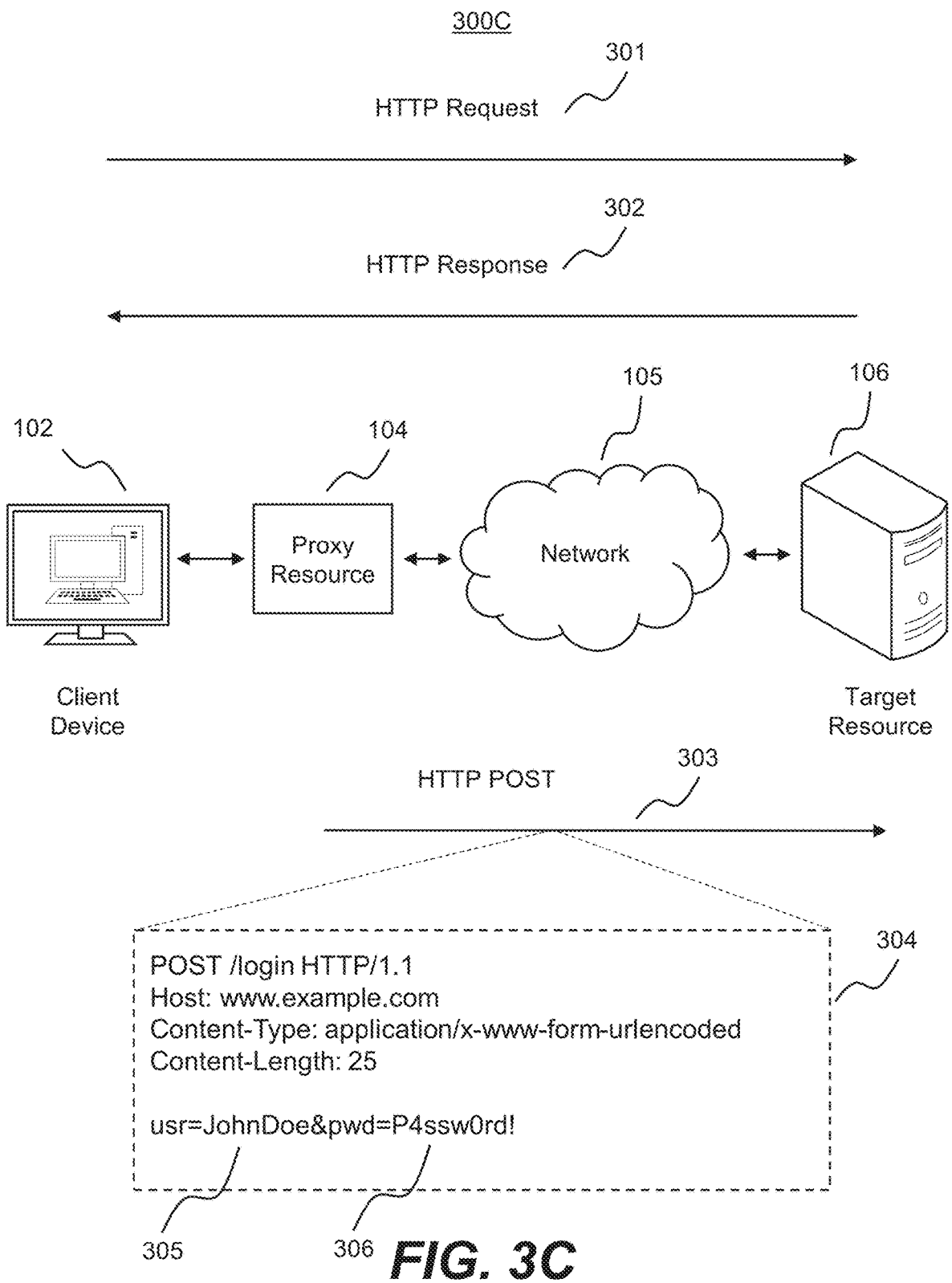
FIG. 3C is a block diagram of an exemplary system showing a detected and intercepted communication being modified and passed through to a network resource, in accordance with disclosed embodiments.

In accordance with FIG. 3C, system 300C may involve proxy resource 104 passing through, after modification, certain communications 303. For example, in the illustration of a username 305 and password 306 being entered, here proxy resource 104 may undo the modification to these data fields that it performed in FIG. 3B. For example, username 305 may be returned to JohnDoe and password 306 may be returned to P4ssw0rd! (i.e., without the .tu and .tp data elements). In this manner proxy resource 104 may allow data communications to pass through to target resource 106 so that target resource 106 is unaware of the modifications performed by proxy resource 104. In this example, the target application at target resource 106 will receive and process the original input (e.g., username 305 of JohnDoe and password 306 of P4ssw0rd!) so that the target application can be further observed in terms of its processing and response back to client device 102. In this manner, target device 106 may return back a response to client device 102 (e.g., including a cookie, executable, web page, application interface, etc.) as if proxy resource 104 had never modified communication 303 to include the unique data elements. The testing or training phase performed by proxy resource 104 may thus be transparent to target resource 106 and its target application.

Figure 4:
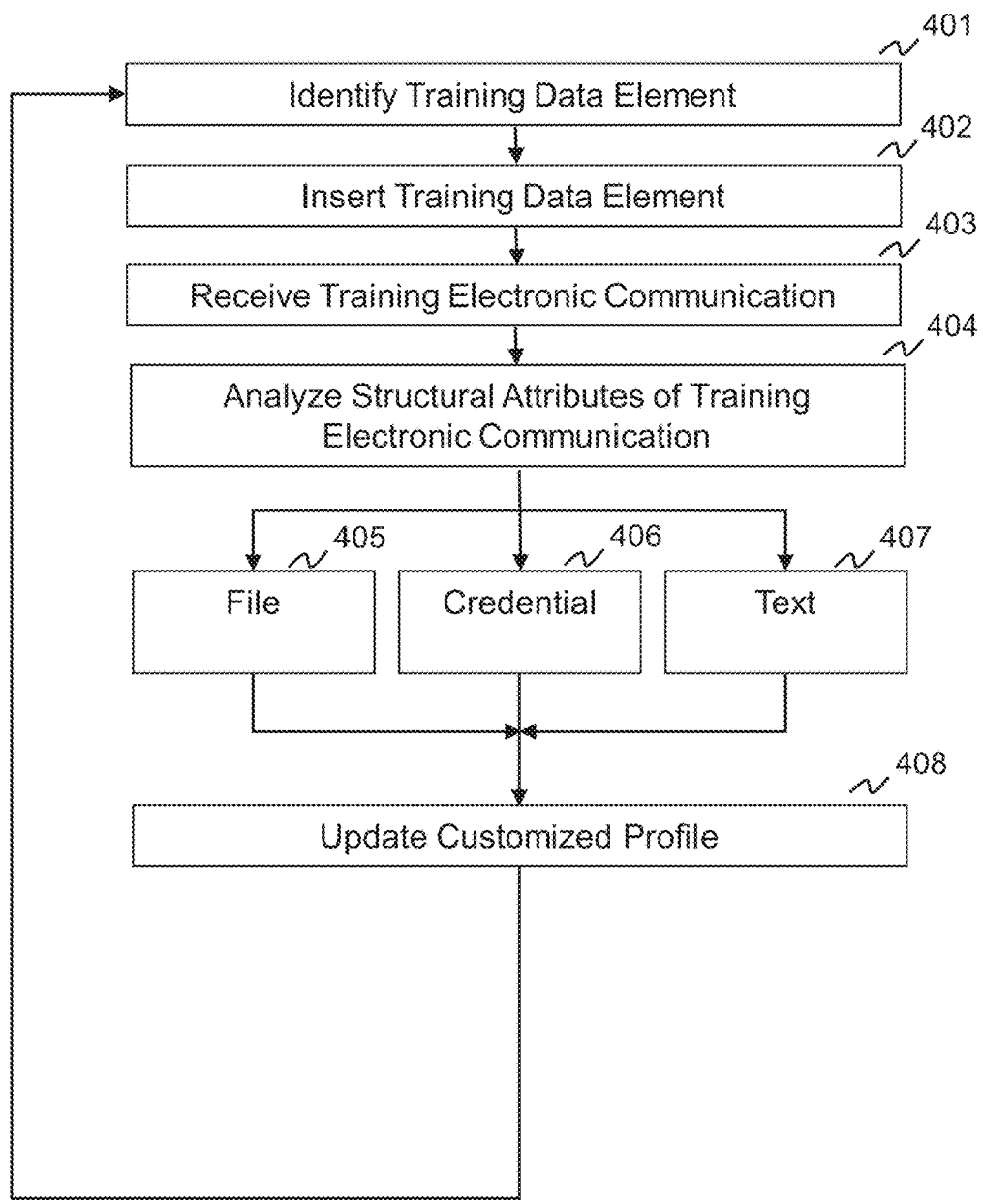
FIG. 4 is a flowchart illustrating an exemplary process for performing a training phase with respect to an application, in accordance with disclosed embodiments.

FIG. 4 illustrates an exemplary process 400 for performing a training phase with respect to an application. For example, consistent with the discussion above, process 400 may be performed by an intermediary agent (e.g., proxy resource 104), either integrated into a client application 101-103 or separate from client applications 101-103.

In an operation 401, process 400 may include identifying a training data element. As discussed above, the training data element may be a unique or identifiable string of text, numbers, an alphanumeric sequence, a unique signature, or any other identifiable data. In some embodiments, the data element may be generated by proxy resource 104 itself. In other embodiments, the data element may be generated by a separate resource (e.g., client 101-103, a separate security server, etc.) and provided to proxy resource 104.

In an operation 402, process 400 may include inserting the training data element into a training electronic communication. As discussed above, the training electronic communication may take several different forms. For example, as described with reference to FIGS. 2A-2D and 3A-3C, the training electronic communication may be a response message or original message addressed to target resource 106. The communication may include, for example, username and password credentials, a file upload, a social media post, a comment form submission, or various other types of communications to a remote web server or hosted application. The training data element may be inserted into or combined with the electronic communication in several ways. For example, as discussed above the training data element may be additional text (e.g., ".tu"and".tp") inserted after or appended to fields included in the electronic communication. In other embodiments, the training data element may be incorporated into the electronic communication in different ways.

Once the training data element has been inserted into the electronic communication in operation 402, client 101-103 may transmit the electronic communication en route to target resource 106. As discussed above, proxy resource 104 may be configured to monitor and potentially intercept such outbound communications from client 101-103. For example, during the training or learning phase, proxy resource 104 may be looking for outbound training communications from client device 101-103 that have the particular training data element (e.g., ".tu" or ".tp" or various other potential training elements). When proxy resource 104 receives the training electronic communication in operation 403, it may then analyze the structural attributes of the training electronic communication. For example, as discussed above, the location or content of the training data element may indicate parameters of the training electronic communication such as HTTP form names (or other types of form names), element names, content encoding settings, multiple fields holding the same vales, encryption settings, target IP addresses, and more. In addition, throughout a session between client device 101-103 and target resource 106, proxy 104 may also be able to identify whether certain fields (e.g., username 305 or password 306 fields, etc.) are being displayed in multiple locations, how long it takes for the target application at target resource 106 to store the data or respond, what additional information target resource 106 provides (e.g., an HTTP cookie, Flash™ cookie, Zombie cookie, Java™ cookie, etc.), whether target resource 106 provides additional content (e.g., executable files, data, etc.) to client device 102, and various other parameters and functionalities.

In some embodiments, the analysis in operation 404 may focus on files being uploaded from client application 101-103 to target resource 106. For example, in some situations the training process of FIG. 400 may be configured to identify instances of users uploading copyrighted or otherwise protected content (e.g., images, videos, music, etc.) to remote locations. Using the testing process of FIG. 4, a training electronic communication may be constructed that includes a training data element (e.g., identifiable text, numbers, or other characters) in conjunction with a file upload. Because the training data element will be then be identified in the training phase when the content is attempted to be uploaded, the training data element will enable proxy resource 104 to pinpoint where in the electronic communication comprising the file upload the uploaded file is included. For example, the file may be identified in a multipart HTTP message. This information, together with other information discovered based on identifying the training data element in the communication, enables proxy resource 104 to understand where file uploads will be contained in electronic transmissions (e.g., HTTP POST messages) and what their attributes will be. Notably, this automatic process does not require any preexisting knowledge of the structure or functionality of the target application that client 101-103 is interfacing with. Similarly, not only may process 400 identify file uploads 405 as part of the analysis in operation 404, but also process 400 may identify credentials 406, text content 407, and various other types of data. Consistent with the techniques described above, by inserting the unique training data element into the communication being transmitted out to the target application (which is intercepted by proxy resource 104), proxy resource 104 can look for that training data element in the training phase and thereby understand the structure and parameters of the training communication. In this manner, proxy resource 104 may learn and understand the particular structural and functional attributes of electronic communications and their associated application.

In some embodiments, the training or learning process 400 further includes updating a customized profile in operation 408. For example, based on the learning steps 401-407, profiles may be developed in a number of ways. In some cases, the profiles may be associated with particular client 101-103 identities, such as users, accounts, or applications. The profiles may define particular training data elements, particular locations in communications associated with those training elements (e.g., field locations), or other attributes of communications (e.g., field parameters, encoding settings, etc.). Further, the profiles may be associated with particular client 101-103 applications. For example, each client 101-103 application may have its own profile based on the learning steps 401-407, where the profile defines the structural attributes and other parameters of communications that are transmitted from the application to the target application. Further, in some embodiments the profiles may be associated with target applications themselves.

Figure 5:
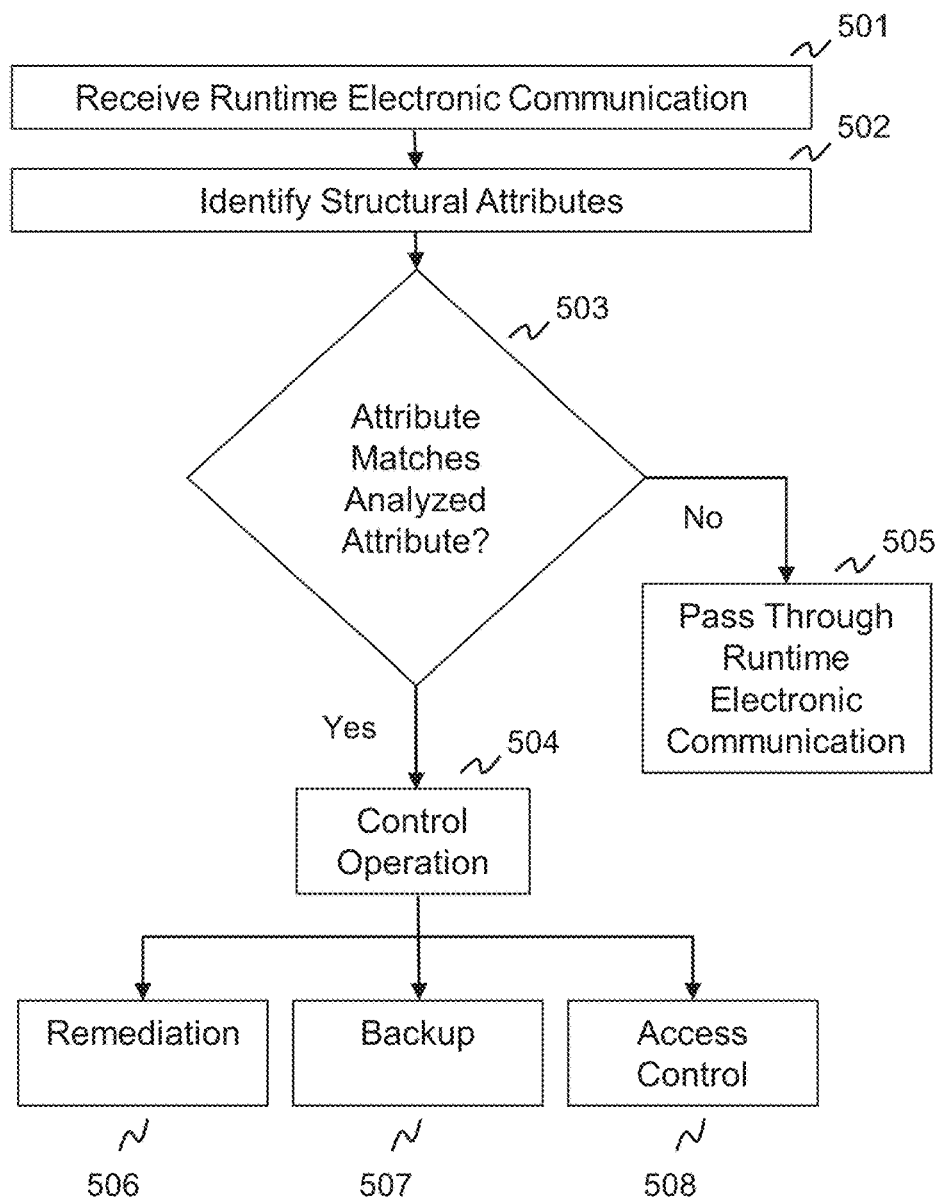
FIG. 5 is a flowchart illustrating an exemplary process for performing a runtime phase with respect to an application, in accordance with disclosed embodiments.

FIG. 5 illustrates an exemplary process 500 for performing a runtime phase with respect to an application. Consistent with the discussion above, process 500 may following the learning or training phases of operation 400. Process 500 may be performed, for example, by proxy resource 104 as discussed above, which may be integrated into client devices 101-103 or separate. In some embodiments, process 500 is performed based on the custom profiles discussed above, which may be specific as to client identities, client applications, or target applications.

In operation 501, process 500 may include receiving a runtime electronic communication transmitted from the interface application. The runtime electronic communication may take several different forms. For example, consistent with the discussion above regarding FIGS. 2A-2D and 3A-3C, the runtime communication may be a communication to a web server or application server containing a username and password, an uploaded file, a social media post, a comment form post, or various other types of communications.

Because the training or learning operations of process 400 have already been implemented, process 500 may now, in operation 502, identify structural attributes analyzed and identified during process 400 for this particular application or identity. As examples of structural attributes, operation 502 may identify parameters of the runtime electronic communication such as HTTP form names (or other types of form names), element names, content encoding settings, multiple fields holding the same vales, encryption settings, target IP addresses, and more. Further, throughout a session between client device 101-103 and target resource 106, proxy 104 may also be able to identify whether certain fields of the communication are being displayed in multiple locations, how long it takes for the target application at target resource 106 to store the data or respond, what additional information target resource 106 provides (e.g., an HTTP cookie, Flash™ cookie, Zombie cookie, Java™ cookie, etc.), whether target resource 106 provides additional content (e.g., executable files, data, etc.) to client device 102, and various other parameters and functionalities.

In operation 503, process 500 may determine whether the runtime electronic communication includes structural attributes that match those of the training phase (e.g., from process 400). As an example, if the training phase identified the particular location and fields in an HTTP response that include a username and password, operation 503 may determine whether the runtime electronic communication (which may be an HTTP response or otherwise) includes those same locations and fields. If not, process 500 may proceed to operation 505 of passing through the electronic communication to its intended target application. In this case, the electronic communication may be deemed to not contain a username and password based on the training phase of FIG. 4.

On the other hand, if the runtime electronic communication includes an attribute matching an attribute discovered during the training process, process 500 may include operation 504 of performing a control operation for the runtime electronic communication. Various types of control operations are possible in operation 504. For example, control operations 504 may include a remediation operation 506 of adjusting a security parameter. As an example, if in operation 503 it was discovered that the runtime communication had a password in a structural location (e.g., field) that did not comply with a password requirement (e.g., password history, length, special characters, etc.) remediation operation 506 may include requiring that the identity using the client interface application update their password. In some embodiments, this type of remediation operation may be performed in conjunction with access control operation 508, which may include blocking the client interface application from using the password to access the target application, disabling the old password, etc. Additional types of remediation operations 506 may include adjusting firewall settings, updating external security software, updating content filters, limiting the access rights of certain (e.g., non-administrator) users, and more.

In further embodiments, control operation 504 may include performing a backup operation 507. For example, if a client interface application is detected in operation 503 of transmitting a runtime communication with an attribute matching an attribute discovered during the learning phase, backup operation 507 may include storing a backup copy (e.g., image, settings information, configuration information, etc.) of the client interface application. The backed-up copy of the client interface application may be automatically generated in operation 507 so that, if the communication to the target application is intercepted and the client interface application becomes vulnerable to attackers, the client interface application can still be backed up to its former state.

A further type of control operation 504 is access control operation 508. In some embodiments, access control operation 508 may block a runtime electronic communication from a client interface application, quarantine the communication for further analysis, including the communication (or identifying information) in a log, generate an alert identifying the communication, request the user of the client application to perform additional authentication (e.g., supplemental or two-factor authentication), or various other types of access control.

The above techniques have many use cases in the areas of automatically identifying data processing and communication attributes of applications. One example, as discussed above, is controlling file uploads. For example, when users upload files from personal or work networks to external resources (e.g., content servers, peer-to-peer file sharing sites, etc.), there is a risk of the users improperly uploading content (e.g., copyrighted content, proprietary or confidential content, etc.). Accordingly, the above techniques may be implemented to investigate how a particular application (e.g., web browser) uploads files to the external resource. As discussed above, the techniques may include identifying a unique data element (e.g., unique text or numeral), embedding or inserting the data element into a training file, and allowing the monitoring resource (e.g., proxy agent or server) to receive the file. The monitoring resource may then identify the data element in the file, and identify the various structural attributes and parameters of the file upload communication (e.g., an HTTP POST communication). Once this particular type of communication and transaction (i.e., file upload) has been identified and included in a profile, similar file upload communications may be identified during a runtime phase. As discussed above, once such similar file upload communications are identified during the runtime phase, control actions may be taken (e.g., blocking the uploads, generating alerts, etc.).

A further use case may relate to managing the use of passwords or other credentials in an organization. In many organizations, there is a desire to discover and eliminate the use of weak passwords or other credentials. Examples may include passwords that are insufficiently long or complex, passwords that are insufficiently new, credentials that have expired, credentials that are intended to be used only by select personnel (e.g., administrators), etc. In order to discover the use of weak passwords and other credentials, the above techniques may be implemented. For example, during a training phase a username and password interface (e.g., from a web page, application, etc.) may be completed using a username and password that contain an additional unique data element (e.g., ".tu"and".tp" as discussed above). Once the modified username and password are input and transmitted, the intermediary resource (e.g., proxy agent or server) may intercept the communication (e.g., HTTP POST) and identify the structural and functional attributes of the username and password in the communication. Once these attributes of the password transmission process have bene learned, future similar username and password transactions may be identified. For such identified transactions, an identified username or password may be scrutinized against a password or credential policy that defines requirements such as length, complexity, age, validity, etc.

As a further use case of the above techniques, organizations may wish to limit the posting of external messages (e.g., via social media, message boards, product reviews, etc.) that contain certain keywords, damaging statements, or unapproved statements. For example, a company selling a particular product may want to detect any employees intending to post messages on external sites (e.g., product review pages) with negative information about the product. Similarly, organizations may wish to guard against employees disclosing to external sites information which may be confidential, proprietary, or trade secret. In these cases, as discussed above, unique data elements may be inserted into communications posts (e.g., in outgoing communications to social media sites, comment posts, product review sites, etc.). Once the intermediary device (e.g., proxy service or server) detects and learns where in such communications commentary is included (e.g., in what fields, using what particular settings, etc.) the intermediary resource may be ready to detect future communications that include similar commentary. In accordance with the above embodiments, when such communications are detected in outbound communications, the intermediary resource may perform a control action (e.g., blocking the communications, generating alerts, etc.).

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for analyzing data communication attributes of a target application without requiring preexisting knowledge of the data communication attributes, the operations comprising:
 implementing, by an intermediary agent functionally located between an interface application and the target application, a training phase with respect to the target application, the training phase comprising:
  identifying a training data element to be transmitted over a network from the interface application to the target application through the intermediary agent, the interface application being executed on a separate computing device from the target application,
  receiving, at the intermediary agent, a training electronic communication from the interface application containing the training data element, wherein the intermediary agent defines the training data element and provides the training data element to the interface application, and the training electronic communication is recognized by the intermediary agent based on the training data element, and
  analyzing the training electronic communication to identify one or more structural attributes of the training electronic communication based on a position of the training data element within the training electronic communication; and
 implementing, by the intermediary agent, a runtime phase with respect to the target application, the runtime phase comprising:
  receiving, at the intermediary agent, a runtime electronic communication transmitted from the interface application,
  identifying, based on the one or more structural attributes identified during the training phase, a corresponding one or more structural attributes of the runtime electronic communication, and
  implementing, based on the corresponding one or more structural attributes, a control operation for the runtime electronic communication.

2. The non-transitory computer readable medium of claim 1, wherein the intermediary agent is implemented as a proxy service between the interface application and the target application.

3. The non-transitory computer readable medium of claim 1, wherein the intermediary agent is implemented as an application running on a machine that also runs the interface application.

4. The non-transitory computer readable medium of claim 1, wherein the control operation includes implementing a security control for the runtime electronic communication.

5. The non-transitory computer readable medium of claim 4, wherein the security control includes at least one of: a remediation operation, a backup operation, or an access control operation.

6. The non-transitory computer readable medium of claim 1, wherein the one or more structural attributes of the training electronic communication include a portion of the training electronic communication containing at least one of: a cookie or an image.

7. The non-transitory computer readable medium of claim 1, wherein the one or more structural attributes of the training electronic communication include a portion of the training electronic communication containing at least one of: an application secret, an identity secret, an application credential, an identity credential, a secure token, an application password, or an identity password.

8. The non-transitory computer readable medium of claim 1, wherein the training phase is performed a plurality of times with respect to a plurality of target applications accessed by a particular identity, and a result of performing the training phase the plurality of times is maintained as a customized profile for the particular identity for use in the runtime phase for the particular identity.

9. The non-transitory computer readable medium of claim 1, wherein the intermediary agent is further configured to, during the runtime phase:
 receive a new runtime electronic communication,
 determine that the new runtime electronic communication does not share the one or more structural attributes identified during the training phase, and
 transmit the new runtime electronic communication to the target application without performing the control operation.

10. The non-transitory computer readable medium of claim 1, wherein the intermediary agent operates transparently to the interface application.

11. A computer-implemented method for analyzing data communication attributes of a target application without requiring preexisting knowledge of the data communication attributes, the method comprising:
 implementing, by an intermediary agent functionally located between an interface application and the target application, a training phase with respect to the target application, the training phase comprising:
  identifying a training data element to be transmitted over a network from the interface application to the target application through the intermediary agent, the interface application being executed on a separate computing device from the target application,
  receiving, at the intermediary agent, a training electronic communication from the interface application containing the training data element, wherein the intermediary agent defines the training data element and provides the training data element to the interface application, and the training electronic communication is recognized by the intermediary agent based on the training data element, and
  analyzing the training electronic communication to identify one or more structural attributes of the training electronic communication based on a position of the training data element within the training electronic communication; and
 implementing, by the intermediary agent, a runtime phase with respect to the target application, the runtime phase comprising:
  receiving, at the intermediary agent, a runtime electronic communication transmitted from the interface application,
  identifying, based on the one or more structural attributes identified during the training phase, a corresponding one or more structural attributes of the runtime electronic communication, and implementing, based on the corresponding one or more structural attributes, a control operation for the runtime electronic communication.

12. The computer-implemented method of claim 11, wherein the interface application is configured to embed the training data element into a document.

13. The computer-implemented method of claim 11, wherein the interface application is configured to enter the training data element into a fillable form.

14. The computer-implemented method of claim 11, wherein the runtime electronic communication includes at least a portion of an HTML document.

15. The computer-implemented method of claim 11, wherein the runtime electronic communication includes at least a portion of a Java-based object.

16. The computer-implemented method of claim 11, wherein the intermediary agent is configured to perform a plurality of different training phases with respect to a plurality of different target applications.

17. The computer-implemented method of claim 11, wherein the one or more structural attributes of the training electronic communication include a position in the training electronic communication of a password.

18. The computer-implemented method of claim 11, wherein the one or more structural attributes of the training electronic communication include a position in the training electronic communication of an uploaded file.

19. The computer-implemented method of claim 11, wherein the one or more structural attributes of the training electronic communication include a position in the training electronic communication of transmitted data.

* * * * *